United States Patent [19]

Kakizaki

[11] Patent Number: 5,064,031
[45] Date of Patent: Nov. 12, 1991

[54] MOTOR OPERATED ACTUATOR WITH POSITION ENCODER FOR STOPPING ACTUATOR AT DESIRED POSITION

[75] Inventor: Shinobu Kakizaki, Kanagawa, Japan

[73] Assignee: Atsugi Unisia Corporation, Kanagawa, Japan

[21] Appl. No.: 408,255

[22] Filed: Sep. 18, 1989

[30] Foreign Application Priority Data

Sep. 20, 1988 [JP] Japan .................. 63-235633

[51] Int. Cl.⁵ .................. F16F 9/46; H01H 1/44; G05B 19/29
[52] U.S. Cl. .................. 188/299; 200/257; 318/602
[58] Field of Search .................. 188/299, 319; 318/601, 318/602; 200/252, 257, 260, 308, 11 G, 11 TC

[56] References Cited

U.S. PATENT DOCUMENTS

| | | | |
|---|---|---|---|
| 4,236,104 | 11/1980 | Spence | 318/602 X |
| 4,516,063 | 5/1985 | Kaye et al. | 318/628 X |
| 4,527,676 | 7/1985 | Emura et al. | 188/299 |
| 4,813,519 | 3/1989 | Matsubara et al. | 188/299 |

FOREIGN PATENT DOCUMENTS

| | | | |
|---|---|---|---|
| 223332 | 1/1958 | Australia | 200/252 |
| 176313 | 8/1961 | Sweden | 200/257 |
| 294495 | 7/1928 | United Kingdom . | |
| 796316 | 11/1958 | United Kingdom . | |
| 835775 | 6/1960 | United Kingdom . | |
| 1108914 | 4/1968 | United Kingdom . | |
| 2143390 | 3/1985 | United Kingdom . | |

Primary Examiner—Robert J. Oberleitner
Attorney, Agent, or Firm—Ronald P. Kananen

[57] ABSTRACT

A motor actuator has a rotary member driven by an electric motor and a position encoder for detecting the actuator at a desired position for stopping the motor. The position encoder employs a strategy of arranging a plurality of brush contactors in axially offset arrangement. The axial arrangement of the brush contactor may reduces required radial space.

6 Claims, 5 Drawing Sheets

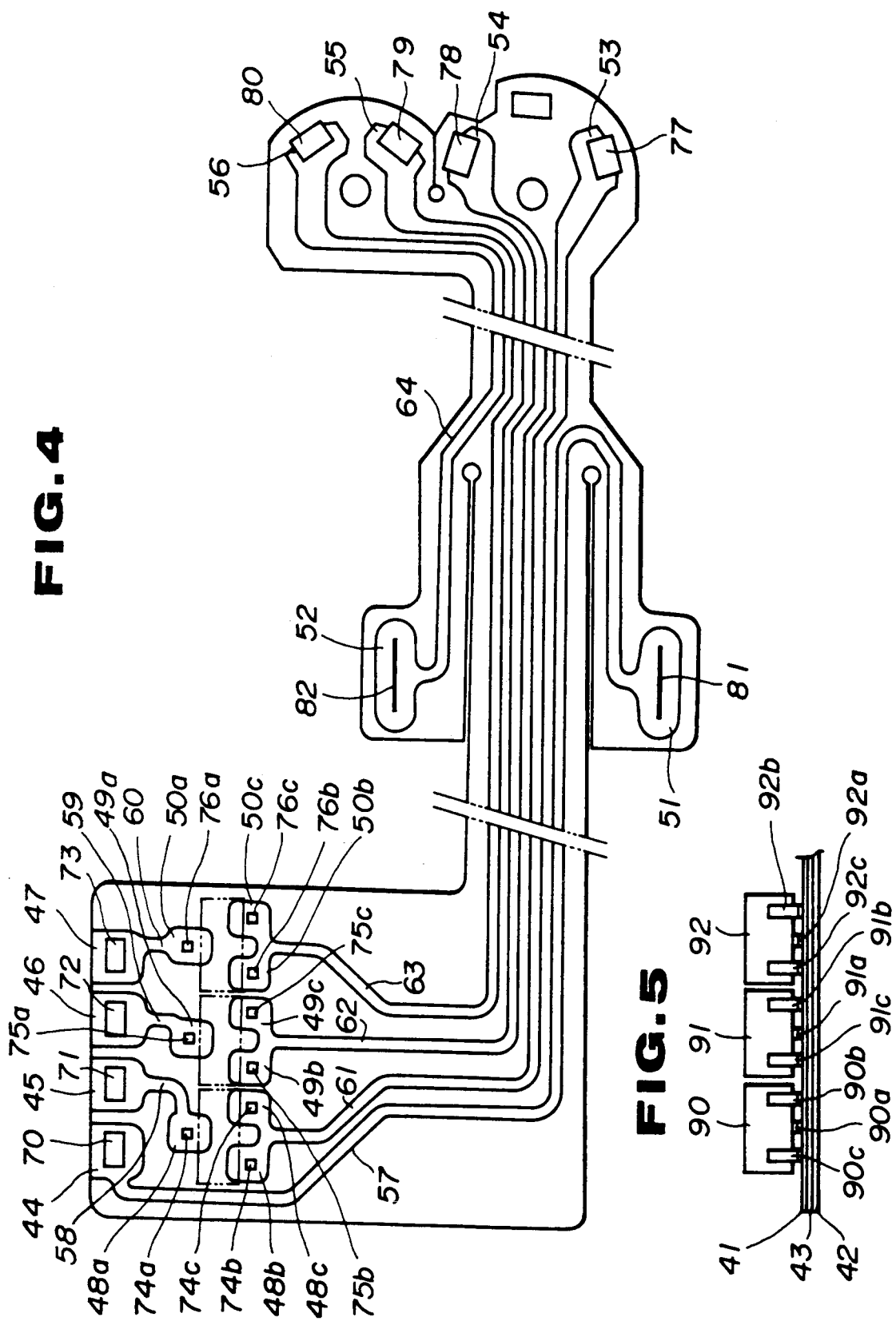

MOTOR OPERATED ACTUATOR WITH POSITION ENCODER FOR STOPPING ACTUATOR AT DESIRED POSITION

BACKGROUND OF THE INVENTION

1. Field of the Invention

The present invention relates generally to an actuator which employs an electric power source as a driving power source and a position encoder for detecting an actuator position for stopping operation of the actuator at a desired position. More specifically, the invention relates to a motor-operated actuator which is suitable for use in a variable damping-characteristics shock absorber, such as a shock absorber in an automotive suspension system.

2. Description of the Background Art

In the automotive technologies, a requirement for variable damping force shock absorbers is increasing for providing variable suspension characteristics in order to achieve both driving stability and riding comfort of the vehicle. For answering this requirement, various constructions of variable damping-characteristics shock absorbers have been developed and put into the market. Some of the suspension systems employing such variable damping-characteristics shock absorbers employ automatic control strategies for automatically adjusting suspension characteristics according to the vehicular driving condition, or, in the alternative, for a remote control strategy for permitting adjustment of suspension characteristics through a manually operable switch arranged in the vehicular cabin. In order to allow automatic or remote control of the damping characteristics of the shock absorber, actuators are to be employed in the shock absorber.

For example, Japanese Utility Model First (unexamined) Publication No. 62-200829, published on Dec. 21, 1987 discloses one type of variable damping characteristics shock absorber employing a rotary valve for adjusting fluid flow restriction and thus adjusting damping characteristics of the shock absorber. In order to drive the rotary valve, a motor operated actuator is employed in the shock absorber. The actuator is associated with a position encoder for detecting the position of the actuator and stopping the motor at a desired position. The position encoder comprises an electrically conductive element with a plurality of circumferentially arranged brush contactors with a predetermined circumferential interval for detecting the angular position of the actuator corresponding to the position of the contactor. In such prior art actuator, a relatively wide transverse space lateral to the longitudinal axis of the shock absorber is required in order to circumferentially arrange the brush contactors.

This clearly prevent the shock absorber from being made more compact.

SUMMARY OF THE INVENTION

Therefore, it is an object of the present invention to provide an actuator which requires a reduced transverse space for installing switching element cooperative with a motor driven rotary element for detecting the desired positions of the actuator.

In order to accomplish the aforementioned and other objects, a motor actuator, according to the present invention, has a rotary member driven by an electric motor and a position encoder for detecting the actuator at a desired position for stopping the motor. The position encoder employs a strategy of arranging a plurality of brush contactors in an axially offset arrangement. The axial arrangement of the brush contactor may reduce required radial space.

According to one aspect of the invention, a motor operated actuator comprises:

a power source motor for generating a driving torque for driving a workpiece;

a position encoder for detecting a plurality of predetermined positions of the workpiece, the position encoder including a plurality of switch elements respectively adapted to break an electric power supply circuit at corresponding predetermined positions of the workpiece wherein the switch elements are arranged in axially position relative to each other.

The electric power supply circuit may include a commander switch for commanding one of the predetermined positions of the workpiece and means responsive to a command selecting one of the predetermined positions, for establishing electrical communication between an electric power source to one of the switch elements corresponding to commanded predetermined angular position of the workpiece. The motor may have an output shaft connected to the workpiece for rotatingly driving the latter, the output being also connected to the position encoder via a converter which converts revolution magnitude of the output shaft into rotational magnitude of the workpiece, and the position encoder detects the workpiece at commanded angular positions by monitoring rotational magnitude converted from revolution magnitude of the output shaft of the motor. In the preferred construction, the position encoder comprises a rotary member to be driven at the converted rotation speed substantially in synchronism with rotation of the work, the rotary member carrying a conductor cooperative with the switching element for breaking the power supply circuit at the angular position of workpiece coincidence with the commanded angular position of the workpiece.

The conductor is provided in common for all of the switching elements and has a plurality of discontinuities at axially and circumferentially offset positions relative to each other so that the discontinuities may break the power supply circuit at the commanded angular position of the workpiece.

Preferably, the switching elements are supported on a common axially extending member in axial alignment to the others.

According to another aspect of the invention, a variable damping characteristics shock absorber comprises:

a hollow cylinder filled with a working fluid:

a piston disposed within the interior space of the cylinder for dividing the interior space into upper and lower chambers and movable according to relative movement between first and second members;

a piston rod connecting the piston to one of the first and second members;

a fluid flow passage means for communication between the first and second chambers defined within the piston rod;

a valve member rotatably disposed within the fluid flow passage and movable between a plurality of predetermined angular positions for providing a variation in fluid flow path area of the fluid flow passage means for providing variable characteristics of damping force to be generated by the shock absorber;

a motor operated actuator having a power source motor for generating a driving torque for driving a valve; and a position encoder for detecting a plurality of predetermined positions of the valve, the position encoder including a plurality of switch elements respectively adapted to break an electric power supply circuit at corresponding predetermined positions of the valve, wherein the switch elements are arranged in axially offset positions relative to each other.

BRIEF DESCRIPTION OF THE DRAWINGS

The present invention will be understood more fully from the detailed description given herebelow and from the accompanying drawings with the associated disclosure of the preferred embodiment of the invention, which, however, should not be taken to limit the invention to the specific embodiment, but are for explanation and understanding only.

In the drawings:

FIG. 4 is a front elevation showing a printed pattern on a printed circuit board employed in the shown embodiment of the motor actuator;

FIG. 5 is a partial side elevation of the printed circuit board of FIG. 4;

DESCRIPTION OF THE PREFERRED EMBODIMENT

Figure 1:
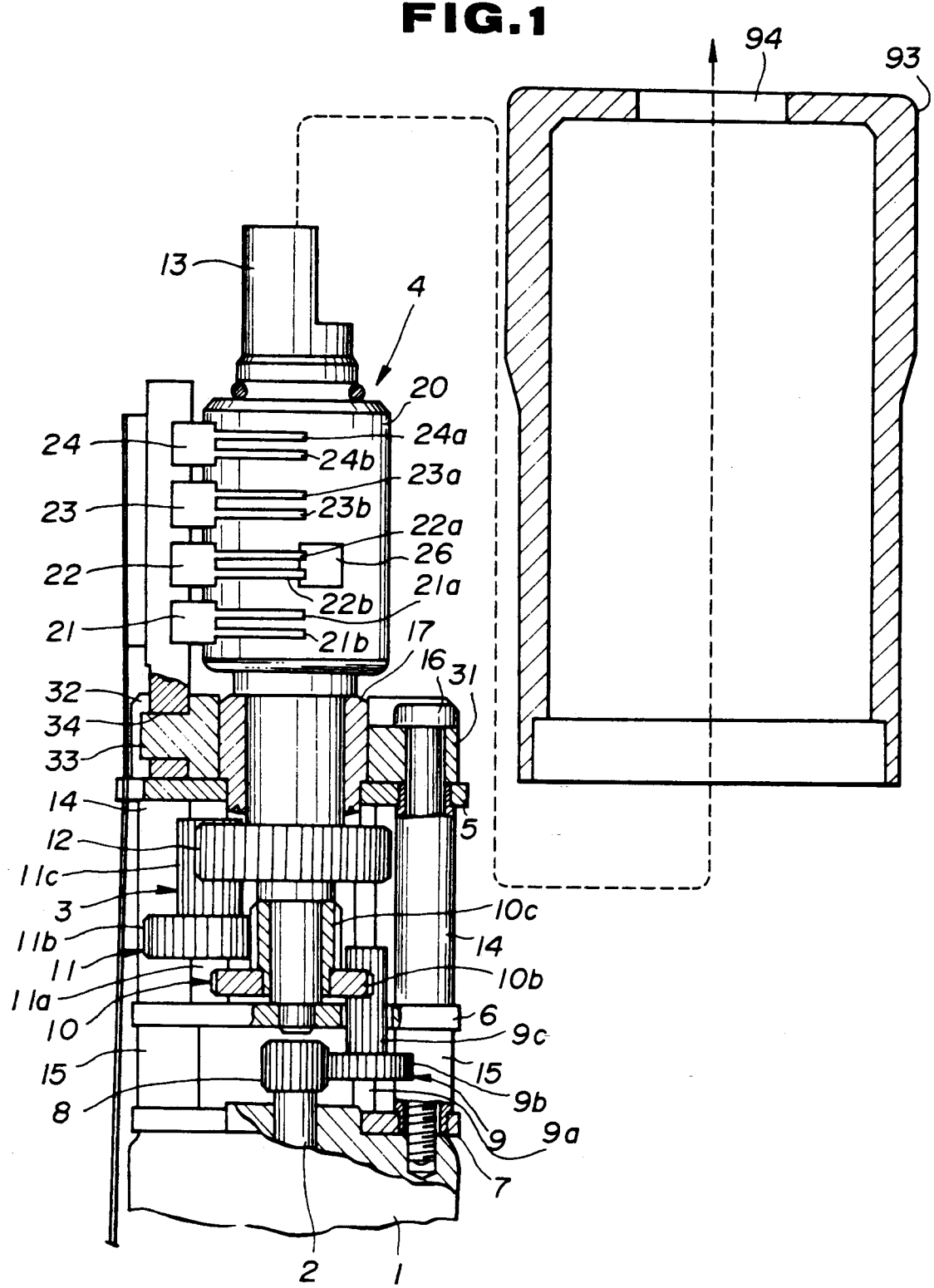
FIG. 1 is a front elevation of the preferred embodiment of a motor actuator according to the present invention, in which an electric motor is shown only in part.

Referring now to the drawings, particularly to FIG. 1, the preferred embodiment of a motor actuator generally comprises an electric motor 1 as a driving torque source, a reduction gear unit 3 associated with an output shaft 2, and a position encoder 4.

The reduction gear unit 3 has first, second and third support plates 5, 6 and 7 are supported by studs 14 and 15 which are rigidly secured onto a motor casing by means of a fastening screw or bolt 16, in an axially spaced-apart relationship to each other. A first intermediate gear 9 is supported for rotation about a gear shaft 9a which extends between the first and third support plates 5 and 7. The first intermediate gear 9 has a greater diameter section 9b and a smaller diameter section 9c. The greater diameter section 9b of the first intermediate gear 9 is engaged with a drive gear 8 which is rigidly secured to the output shaft 2 so as to be driven by the motor output torque. The smaller diameter section 9c of the first intermediate gear 9 is engaged with a greater diameter section 10b of a second intermediate gear 10 which is supported for rotation about an output shaft 13 extending from the second support plate 6. The second intermediate gear 10 has a smaller diameter section 10c is engaged with a greater diameter section 11b of a third intermediate gear 11 which is supported for rotation about a gear shaft 11a extending between the first and second support plates 5 and 6. A smaller diameter section 11c of the third intermediate gear 11 is engaged with a driven gear rigidly fixed to the output shaft 13 which is retatably supported by the first and second support plates 5 and 6. Also, the output shaft 13 is arranged in alignment with the output shaft 2 of the motor 1.

The output shaft 13 is rotatably supported on the first support plate 5 by means of a bearing sleeve 17. On the other hand, the end of the output shaft 13 is formed into a small diameter section and engages with an axial hole formed through the second support plate 6.

The position encoder 4 is designed to monitor the instantaneous position of the workpiece through a rotating angular magnitude of the output shaft 13. The position encoder 4 includes a rotary body 20 having a periphery on which the electrically conductive pattern is formed. A plurality of brush contactors 21, 22, 23 and 24 are arranged for sliding contact with the conductive pattern on the rotary body 20. The rotary body 20 includes an insulating cylinder 25 which is rigidly secured to the output shaft 13. A conductive pattern 20a is formed on the insulating cylinder 25 by printing. The conductive pattern 20 is includes non-conductive segments 26, 27 and 28 which are formed by forming cutouts in the printed conductive pattern and filling an insulating material therein. The insulative segments 26, 27 and 28 are arranged in axially and circumferentially offset position and respectively oriented at positions corresponding to desired positions of the actuator.

The position encoder 4 is housed within a head casing 93. The head casing 93 is engaged to the outer circumference of the first support plate 5 of the reduction gear unit 3. A through opening 94 is formed through the head casing 93 in the top plate, through which the upper end of the output shaft 13 of the reduction gear unit 3 extends.

Figure 2:
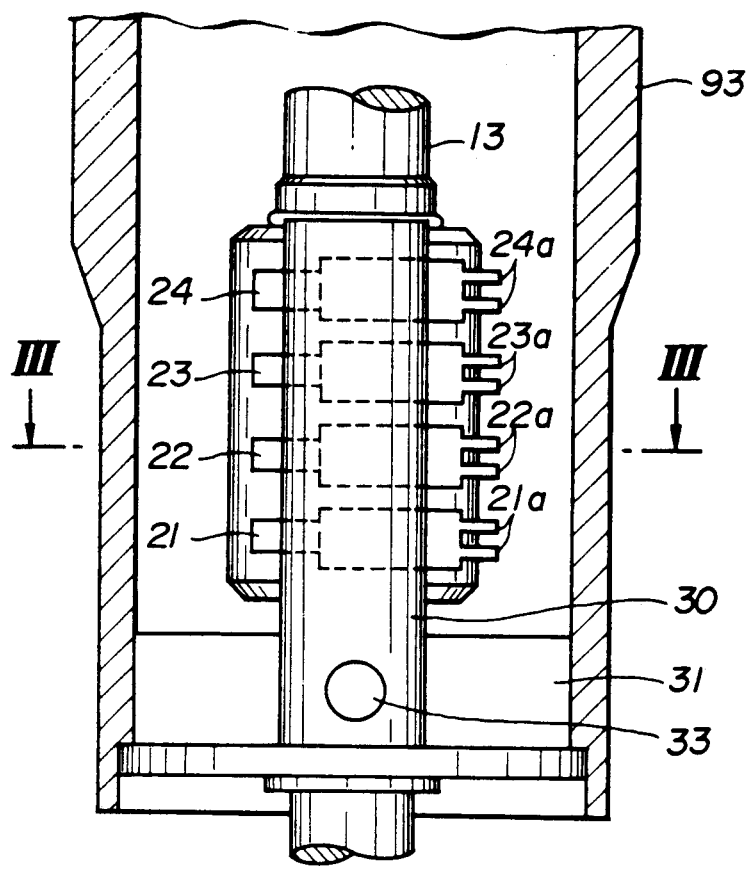
FIG. 2 is a partial side view of the preferred embodiment of the motor actuator of FIG. 1, which is viewed from the left side in FIG. 1.
Figure 3:
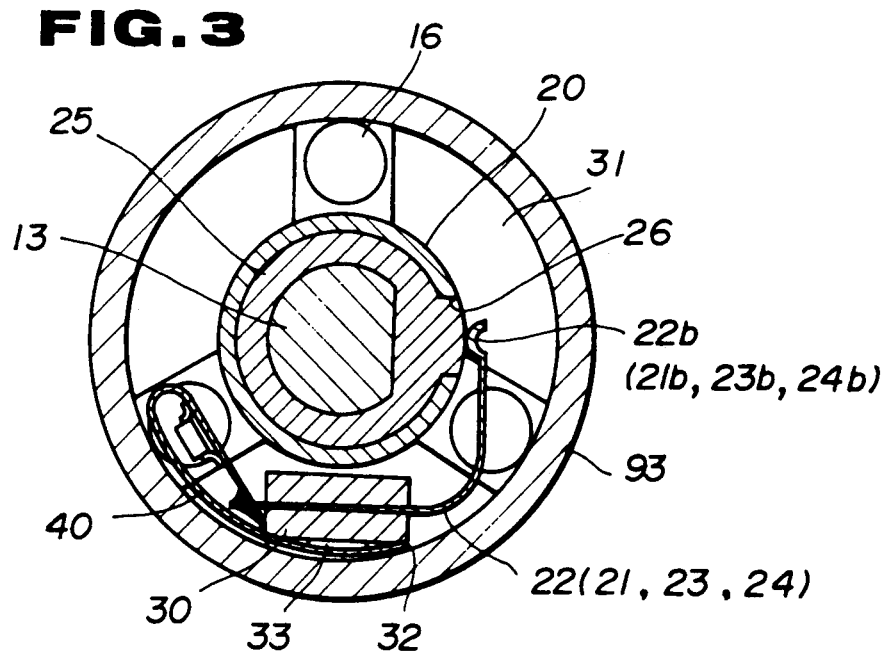
FIG. 3 is a section taken along line III—III of FIG. 2.
Figure 6:
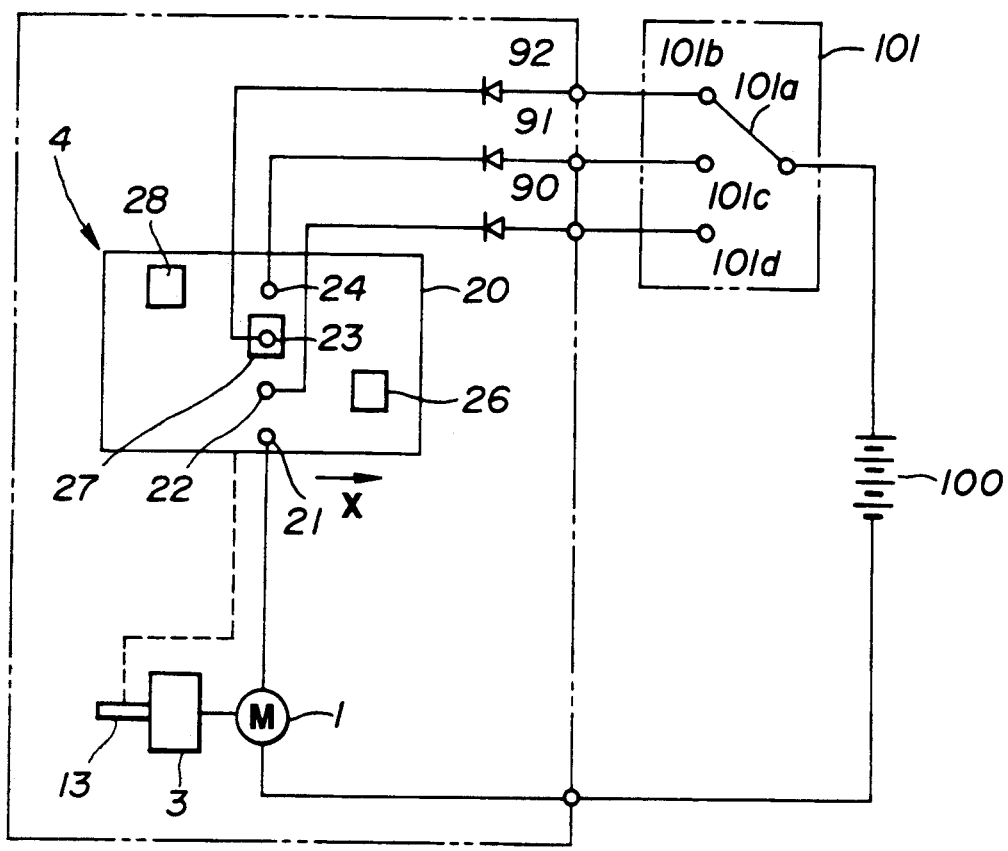
FIG. 6 is a circuit diagram employed in the shown embodiment of the motor actuator.
Figure 7:
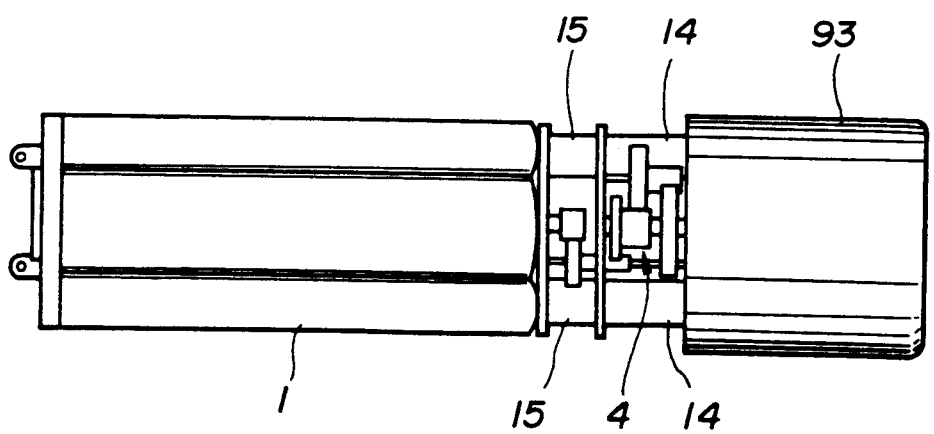
FIG. 7 is a side elevation showing the overall unit of the preferred embodiment of the motor actuator.

As can be seen from FIGS. 1, 2 and 6, the brush contactors 22, 23 and 24 are axially oriented to mate with corresponding ones of the insulating segments 26, 27 and 28. On the other hand, the brush conductor 21 is oriented out of the traces of respective insulating segments and thus constantly in contact with the conductive pattern 20, as particularly seen from FIG. 6. These brush contactors 21, 22, 23 and 24 are supported on an electrically insulating pole 30. In practice, the brush contactors 21, 22, 23 and 24 are inserted during molding of the insulating pole 30 so that they may be secured at the intermediate portions thereof to the pole in integral fashion. One end of each contactor 21, 22, 23 and 24 is formed to have bifurcated legs 21a, 22a, 23a and 24a and bent at approximately right angle. Each leg 21a, 22a, 23a and 24a is respectively formed with a contactor head 21b, 22b, 23b and 24b which is bent in a semi-circular configuration, as shown in FIG. 3. The other end of each contactor 21, 22, 23 and 24 is connected to a terminal strip 44, 45, 46 and 47 of a printed circuit board 40.

The insulative pole 30 is coupled with a fourth support plate 31 provided adjacent the first support plate 5. For this, the fourth support plate 31 is formed with a cut-out 32 and a projection 33 projecting into the cut-out. The pole 30 is formed with a through opening 34 to receive therethrough the projection 33. For rigidly securing the pole 30 to the fourth support plate 31, the end portion of the projection 33 projecting through the through opening 34 is clamped. The fourth support plate 31 is secured on the first support plate 5 by means of the fastening screw 16 in common to other support plates.

The printed circuit board 40 is formed into a flexible type circuit board. The printed circuit board 40 is formed by bonding a thin copper strip 42 by an adhesive 43 on an electrically insulative base film 41. Then, a circuit pattern is formed by etching. Part of the circuit board 40 is inserted into the groove 32 of the fourth support plate 31 as shown in FIG. 3. In the groove 32, the printed circuit board 40 is connected to the motor 1 and to the position encoder 4.

The printed pattern on the printed circuit board 40 includes the terminal strips 44, 45, 46 and 47 for connection with the brush contactors 21, 22, 23 and 24. Also, the printed pattern includes terminal strips 48a, 48b, 48c, 49a, 49b, 49c, 50a, 50b and 50c for connecting diodes 90, 91 and 92. Furthermore, the printed pattern includes terminal strips 51 and 52 for connection with the motor 1. The printed pattern also has terminal strips 53, 54 and 55 which are designed to be connected to stationary terminals (not shown) of a commander switch, through which operation command for the actuator is entered. A terminal strip 56 is further provided in the printed pattern for connecting the circuit to a movable terminal of the commander switch. These terminal strips are connected via conducting lines 57, 58, 59, 60, 61, 62, 63 and 64. Respective of the terminal strips 44 through 56 set forth above are formed with through holes 70, 71, 72, 73, 74a, 74b, 74c, 75a, 75b, 75c, 76a, 76b, 76c, 77, 78, 79 and 80, and slits 81 and 82.

The diode 90 has three leads 90a, 90b and 90c passing through the holes 74a, 74b and 74c and connected to the terminal strips 48a, 48b and 48c. Similarly, the diode 91 has three leads 91a, 91b and 91c connected to the terminal strips 49a, 49b and 49c via holes 75a, 75b and 75c, and the diode 92 has three leads 92a, 92b and 92c connected to the terminal strips 50a, 50b and 50c via holes 76a, 76b and 76c.

As shown in FIG. 6, the motor 1 is connected in series between the normally closed brush contactor 21 of the position encoder 4 and a power source 100. The diodes 90, 91 and 92 are connected to the brush contactors 22, 23 and 24. The power source 100 and the diodes 90, 91 and 92 are connected via the commander switch unit 101 which has three stationary terminals 101b, 101c and 101d and a movable contact 101a.

The operation of the actuator will be discussed herebelow with reference to FIG. 6. Assuming that the commander switch 101 is in the shown switch position to connect the power source 100 to the stationary terminal 101b via the movable terminal 101a. At this switch position, the power source 100 is connected to the brush contactor 23 via the commander switch 101 and the diode 92. At the position in FIG. 6, the insulative segment 27 of the printed conductive pattern 20a is in contact with the brush contactor 23 for breaking the power circuit for supplying the electric power for the motor 1 which is connected to the normally closed brush contactor 21. At this position, the actuator stays at an angular position corresponding to the position commanded through the commander switch 101.

From this position, if the commander switch 101 is manually operated for commanding other angular position of the actuator by switching the movable terminal 101a to one of the stationary contact 101c or 101d, the power supply circuit for supplying the electric power to the motor is established through the commander switch 101, one of the diodes 91 and 90, and the position encoder 4 in which the brush contactor 24 or 22 is in electrical communication with the brush contactor 21 via the conductive pattern. Therefore, the motor 1 is driven to cause angular displacement toward the commanded position.

Here, assuming the commander switch 101 is operated to shift the movable terminal 101a to the stationary terminal 101c to connect the power source 100 to the brush contactor 24 via the diode 91. Then, the power is supplied to the motor via the brush contactor 24, the conductive pattern 20a and the brush contactor 21 for driving the actuator in a direction X. Accordingly, the rotor body 20 is rotated in the direction X. During rotational movement of the rotary body 20, the insulative segment 28 comes into contact with the brush contactor 24 at the angular position of the actuator corresponding to the commanded actuator position.

Figure 8:
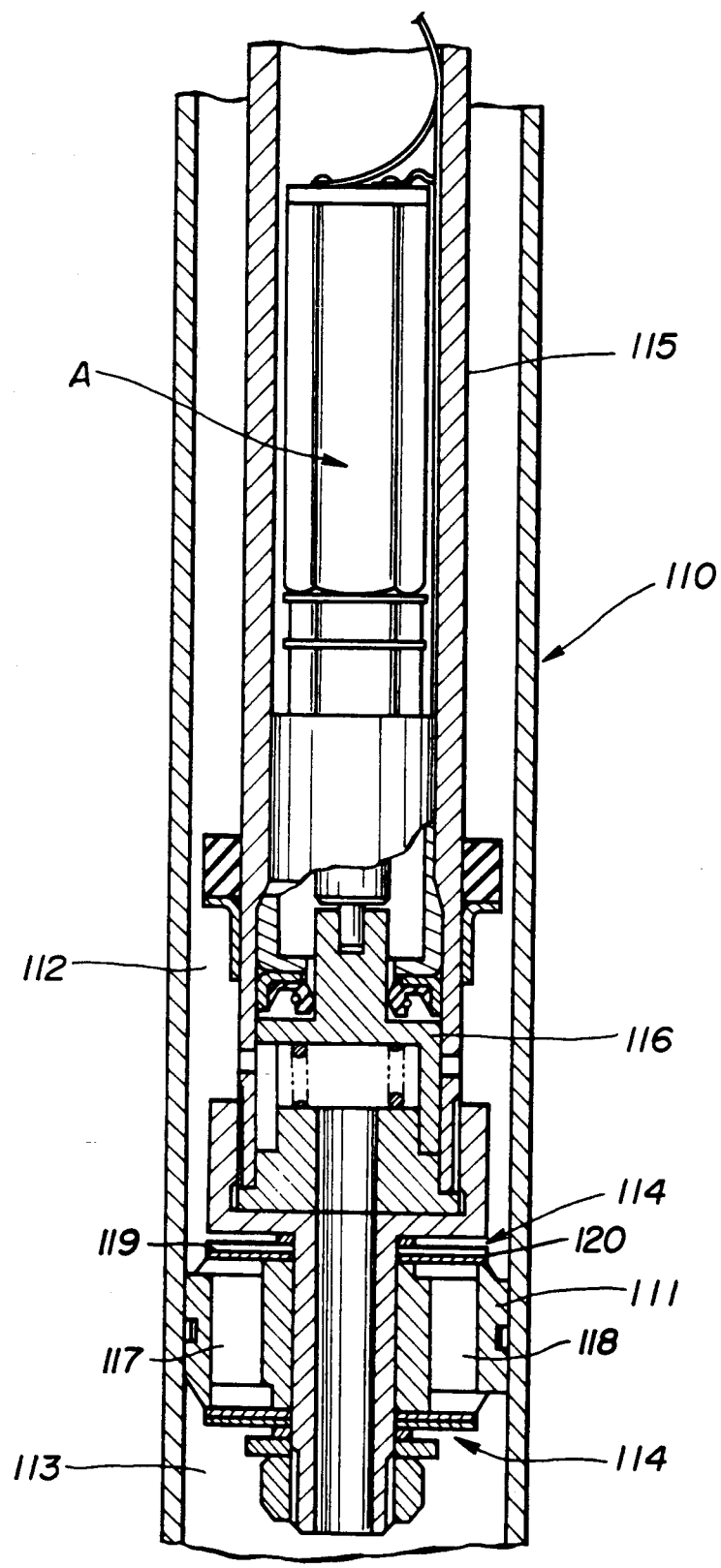
FIG. 8 is a sectional view of a variable damping characteristics shock absorber employing the preferred embodiment of the motor actuator.

FIG. 8 shows a variable damping characteristics shock absorber employing the shown embodiment of the actuator according to the invention as one example of application. The shock absorber 110 has a hollow cylinder, in which a piston 111 is secured onto the lower end of a piston rod 115. The piston 111 divides the interior space of the cylinder into upper and lower fluid chambers 112 and 113. In the shown embodiment, damping force is generally generated by orifices 117 and 118 formed through the piston and disc valves 119 and 120 associated with respective orifices.

A damping characteristics adjusting rotary valve 116 is disposed within the hollow cylindrical piston rod 115 for varying a fluid flow path area through the rotary valve. The rotary valve is cooperative with a radial port defined through the piston rod for adjusting a fluid flow path area by-passing the orifices of the piston and thereby adjusting damping characteristics of the shock absorber.

The shown embodiment of the actuator is thus associated with the rotary valve for rotatingly driving the rotary valve for adjusting fluid flow path area. Such type of variable damping characteristics shock absorber has been disclosed in U.S. Pat. No. 4,776,437, issued on Oct. 11, 1988, and assigned to the owner of the present invention. The disclosure of the above-identified U.S. Pat. will be herein incorporated by reference for the sake of disclosure.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A motor operated actuator comprising:
 a power source motor for generating a driving torque for driving a workpiece, said power source motor having an output shaft;
 a speed reducer engaging said output shaft of the power source motor and having an output shaft connected to said workpiece, said speed reducer serving to reduce rotation speed of said workpiece relative to that of said output shaft of the power source motor; and
 a position encoder for causing said workpiece to be stopped at a plurality of predetermined angular positions, said position encoder including an essentially cylindrical member arranged around and rotating with said output shaft of the speed reducer, and a plurality of switch elements respectively adapted to break an electric power supply circuit at corresponding predetermined angular positions of said workpiece, said switch elements being arranged on said cylindrical member in axially offset positions relative to each other.

2. An actuator as set forth in claim 1, wherein said electric power supply circuit includes a commander switch for commanding one of said predetermined angular positions of said workpiece, and means responsive to a command selecting one of said predetermined angular positions, for establishing an electrical communication between an electric power source to one of said switch elements corresponding to the commanded predetermined angular position of said workpiece.

3. A actuator as set forth in claim 1, wherein said actuator is applied to a variable damping characteristics shock absorber.

4. An actuator as set forth in claim 1, wherein said actuator is applied to a variable damping characteristics shock absorber.

5. A motor operated actuator comprising:
   a power source motor for generating a driving torque for driving a workpiece, said power source motor having an output shaft;
   a speed reducer engaging said output shaft of the power source motor and having an output shaft connected to said workpiece, said speed reducer serving to reduce rotation speed of said workpiece relative to that of said output shaft of the power source motor;
   a position encoder for causing said workpiece to be stopped at a plurality of predetermined angular positions, said position encoder including an essentially cylindrical member arranged around and rotating with said output shaft of the speed reducer, and a plurality of switch elements arranged on said cylindrical member in axially offset positions relative to each other;
   a cylindrical casing defining therein a cylindrical space for covering said cylindrical member of the position encoder; and
   a plurality of switch members connected to said cylindrical casing, said switch members being respectively associated with said switch elements to break an electric power supply circuit at corresponding predetermined angular positions.

6. An actuator as set forth in claim 5, wherein said electric power supply circuit includes a commander switch for commanding one of said predetermined angular positions of said workpiece, and means responsive to a command selecting one of said predetermined angular positions, for establishing an electrical communication between an electric power source to one of said switch elements corresponding to the commanded predetermined angular position of said workpiece.

* * * * *